United States Patent [19]

Strum et al.

[11] 4,156,136

[45] May 22, 1979

[54] LIGHT ACTIVATED ACOUSTIC PINGER

[75] Inventors: James A. Strum; Richard W. Mace, both of Poulsbo, Wash.

[73] Assignee: The United States of America as represented by the Secretary of the Navy, Washington, D.C.

[21] Appl. No.: 847,343

[22] Filed: Oct. 31, 1977

[51] Int. Cl.$^2$ ............................................. H01J 39/12
[52] U.S. Cl. .................................. 250/215; 250/338; 356/5; 356/152
[58] Field of Search ................ 250/215, 338; 340/3 E; 356/5, 152

[56] References Cited

U.S. PATENT DOCUMENTS

| 2,976,419 | 3/1961 | Mencke et al. | 250/338 |
| 3,893,061 | 7/1975 | Slawsky et al. | 340/3 E |

Primary Examiner—Lawrence J. Dahl
Attorney, Agent, or Firm—R. S. Sciascia; Charles D. B. Curry

[57] ABSTRACT

A light activated acoustic pinger that is useful for underwater three dimensional homing. The pinger includes a spherical lens system, a tone burst generator electronics system and a high pressure water tight encasement. When a light source used by an underwater diver, submersible, underwater television system or navigator is panned on the pinger lens system in either the X or Y planes the ping rate will vary depending upon the incident angle of the light received by the spherical lens. In addition, moving the light toward the pinger in the Z direction will increase the ping rate. From the ping rate and the movement of the light source in the X, Y and Z directions an underwater navigator can determine the direction of the pinger and target. There is no battery drain until the pinger is activated by light and therefore targets that have been lost for several years may still be found based on battery shelf life.

7 Claims, 8 Drawing Figures

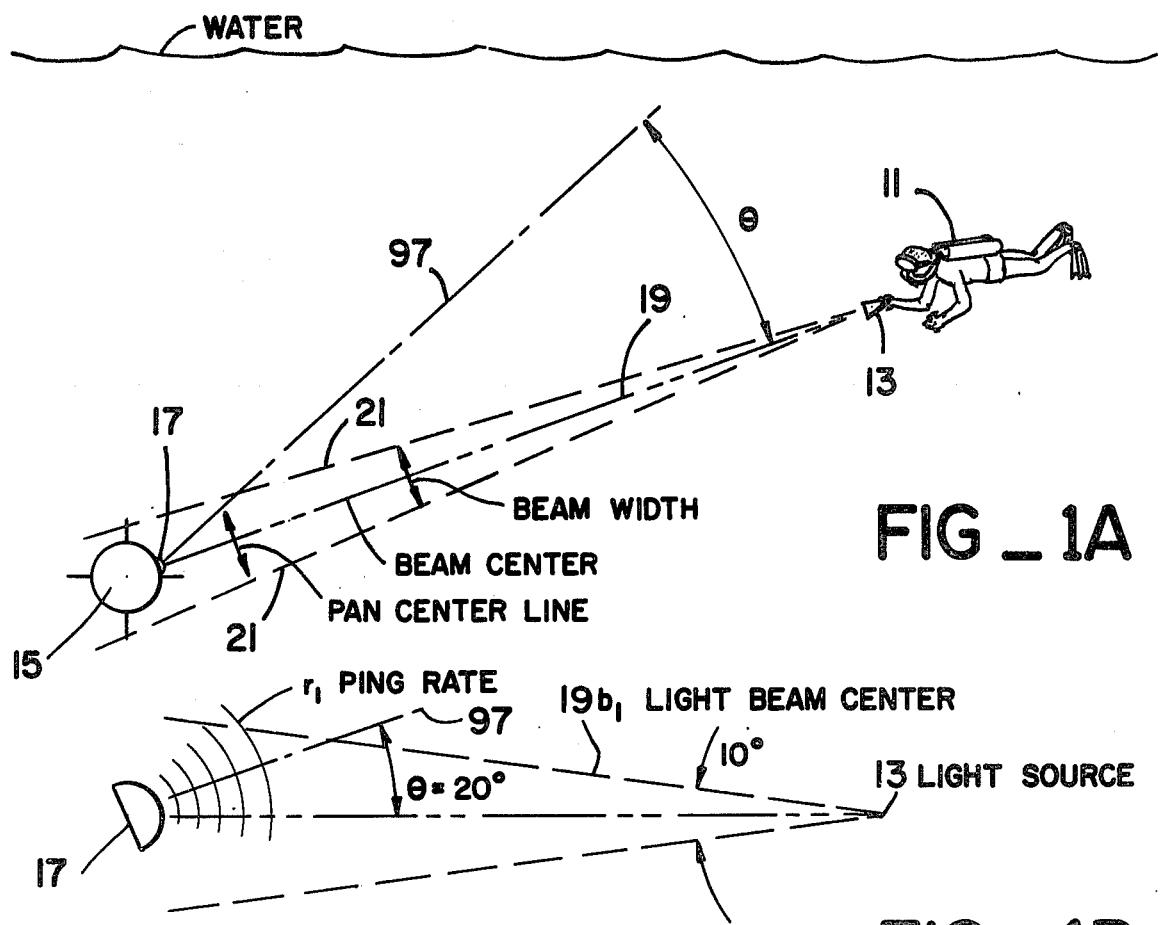
FIG _ 1A
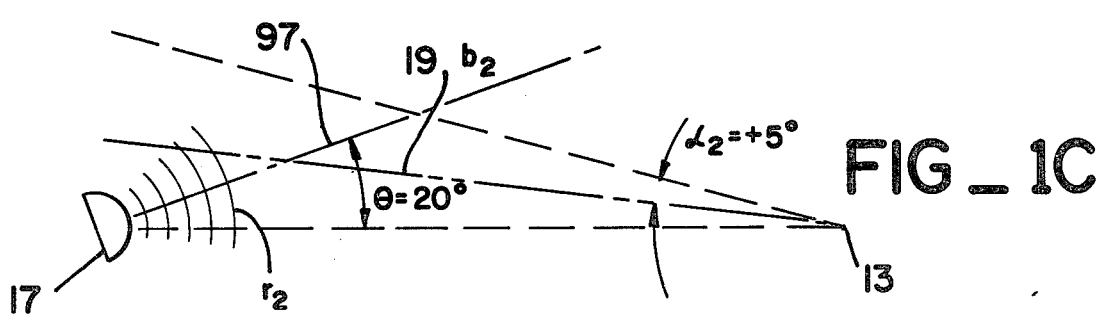
FIG _ 1B
FIG _ 1C
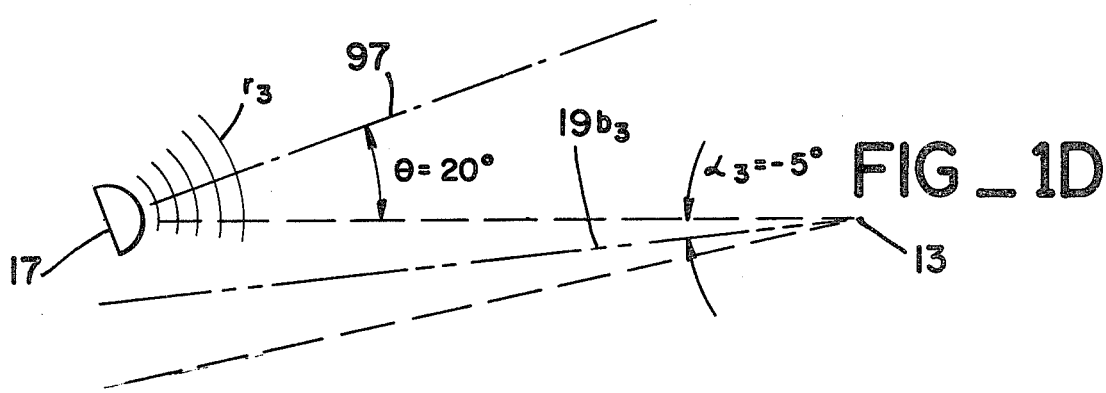
FIG _ 1D

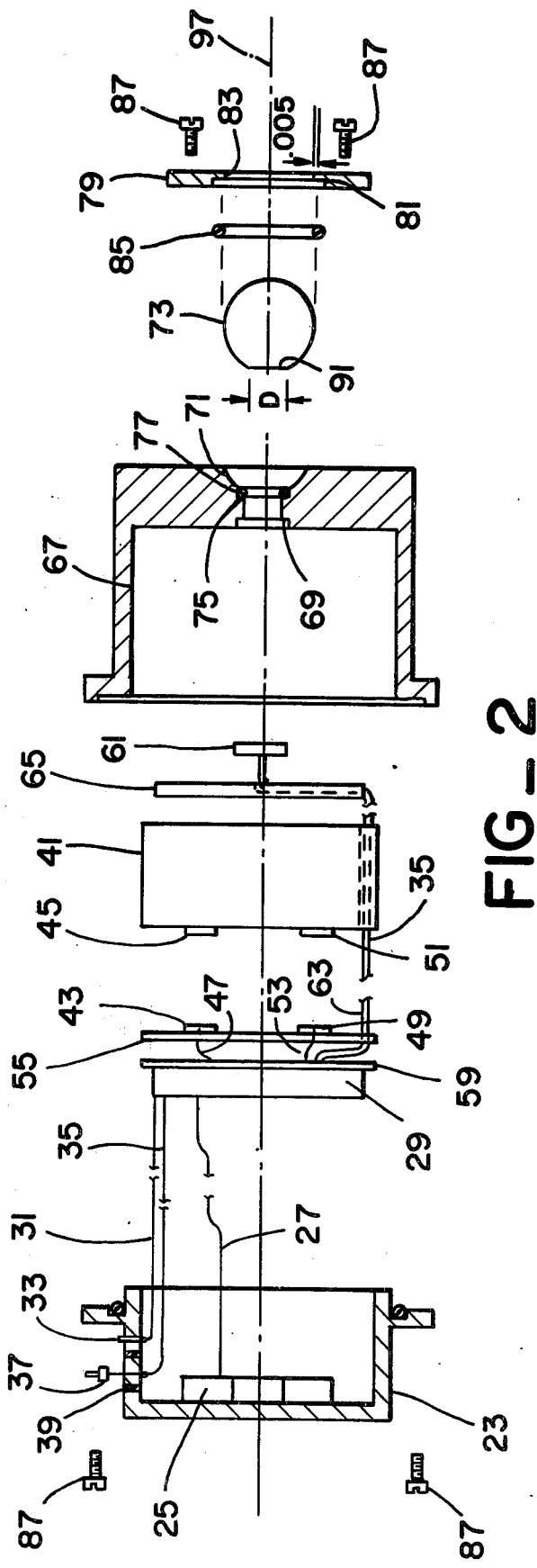
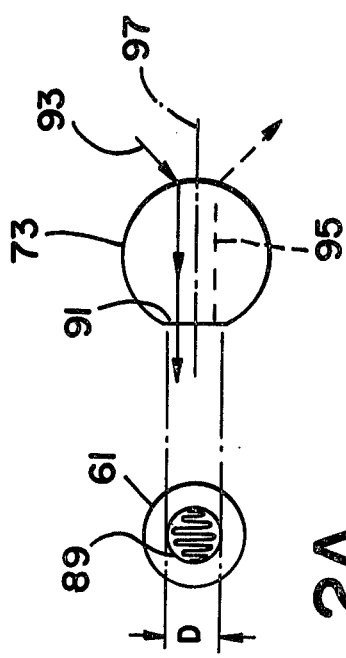
FIG_2
FIG_2A

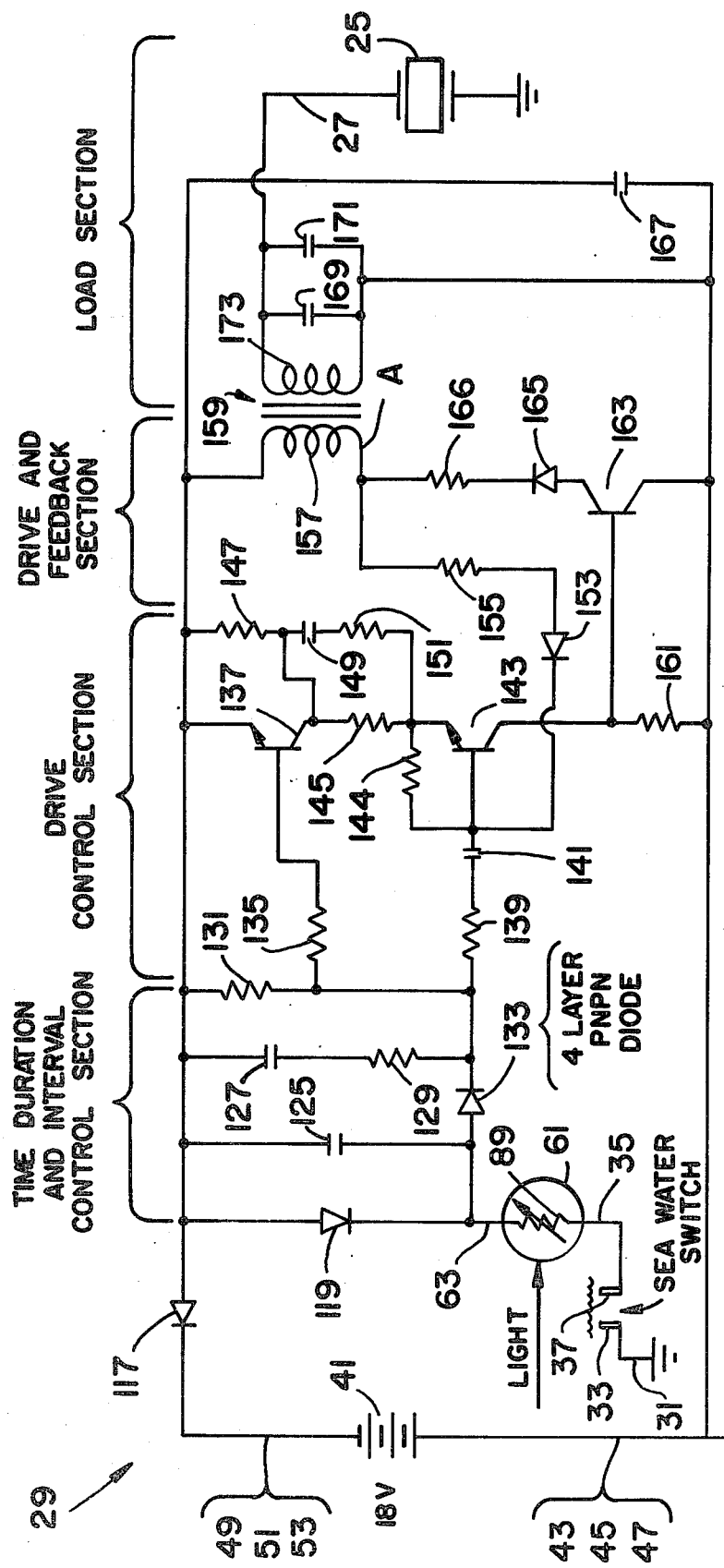
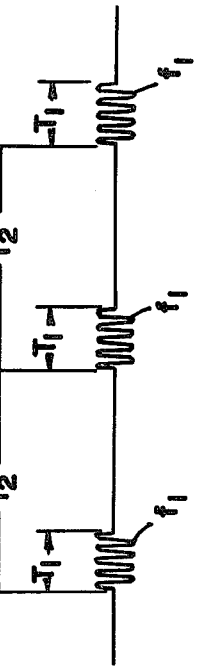
FIG_3
FIG_4

LIGHT ACTIVATED ACOUSTIC PINGER

BACKGROUND OF THE INVENTION

1. Field of the Invention

The present invention relates to a pinger device and more particularly to a light activated pinger device that is part of a three dimensional homing system.

2. Description of the Prior Art

Underwater target locating is a continuing problem and especially in underwater weapons test ranges. As a rule the general location of an underwater target is known but it is still very difficult to precisely locate even by complex recovery vehicles. Currently underwater recovery vehicles are deployed in the general target location and must attempt to locate the target by underwater television or by homing on a pinger having a constant ping rate. When the pinger is active the target may be located with a directional sonar system. A major problem is encountered when the pinger ceases to operate due to battery drain before the target is located. In this situation visual observation with the assistance of a light source or magnetic detection must be relied upon. Visual observation is severely limited by particulate matter (backscatter) and spectral bandwidth.

The present invention overcomes these problems by providing a light activated acoustic pinger that provides a ping rate that is a function of the distance and angle of the impinging light. This makes possible three dimensional homing by a submersible using only a collimated light source and a directional acoustic receiver to locate the target.

SUMMARY OF THE INVENTION

Briefly, the present invention comprises a light activated acoustic pinger that is useful for underwater three dimensional homing. The pinger includes a spherical lens system, a tone burst generator electronics system and a high pressure water tight encasement. When a light source used by an underwater diver, submersible, underwater television system or navigator is panned on the pinger lens system in either the X or Y planes the ping rate will vary depending upon the incident angle of the light received by the spherical lens. In addition, moving the light toward the pinger in the Z direction will increase the ping rate. From the ping rate and the movement of the light source in the X, Y and Z directions an underwater navigator can determine the direction of the pinger and target. There is no battery drain until the pinger is activated by light and therefore targets that have been lost for several years may still be found based on battery shelf life.

STATEMENT OF THE OBJECTS OF THE INVENTION

An object of the present invention is to provide a light activated acoustic pinger;

Another object of the present invention is to provide an acoustic pinger that has a ping rate that is the function of impinging light intensity;

Still another object of the present invention is to provide a light activated pinger that may be used for three dimensional homing;

A still further object of the present invention is to provide a pinger that includes a spherical lens system, a tone burst generator electronics system and a high pressure water light encasement that has a ping rate that is responsive to the angle of incident light and to the distance of incident light;

A further object of the present invention is to provide a pinger system that is quiescent until light activated;

Other objects, advantages and novel features of the invention will become apparent from the following detailed description of the invention when considered in conjunction with the accompanying drawings wherein:

BRIEF DESCRIPTION OF THE DRAWINGS

FIGS. 1A-1D are schematic diagrams illustrating how the light activated pinger and an underwater diver using a collimated light source can provide three dimensional homing in accordance with the present invention;

FIG. 2 is an exploded view of the mechanical and optical construction of the light activated acoustic pinger of the present invention;

FIG. 3 is a schematic diagram of the electronic circuit used in the light activated acoustic pinger of the present invention; and FIG. 4 is a diagram illustrating the operation of the FIG. 3 circuit.

DESCRIPTION OF THE PREFERRED EMBODIMENT

FIGS. 1A through 1D are schematic diagrams illustrating how the light activated pinger and an underwater diver using a collimated light source can provide three dimensional homing in accordance with the present invention. In FIG. 1A an underwater diver 11 is shown holding a collimated light source 13 that is being used to locate a target 15 that has mounted on it the light activated acoustic pinger 17 of the present invention. The light source 13 is shown having a light beam center as illustrated by broken line 19 and a beam width as illustrated by dotted lines 21. The directivity of the system is achieved by the diver panning the light source in the X plane, and then the Y plane, for example. In FIGS. 1B, 1C and 1D are shown the effect of panning. In this example it may be assumed that the X axis is in the plane of the paper, that $\theta$ represents the angle between the center lines of the light source and the pinger lens system, and the angle $\alpha$ represents the panning angle. In FIG. 1B the light beam center $b_1$ is shown as impinging upon the pinger 17 wherein the ping rate of the pinger has the maximum rate $r_1$, for this example. As the light beam is panned in one direction as shown by $b_2$ in FIG. 1C, the ping rate $r_2$ of the pinger will decrease ($r_2 < r_1$) and as the light beam is panned in the other direction, as shown by $b_3$ in FIG. 1D, the ping rate $r_3$ of the pinger will also decrease ($r_3 < r_1$). By panning in this manner (in both the X and Y planes) the diver can point the light beam at the target and then swim toward the target. As he swims toward the target the ping rate will also increase and inform the diver that he is homing in on the target. The diver may again stop and check the target direction by panning in the X and Y planes and then again swim or home on the target. It has been found that divers, after some practice, may very effectively home in on targets in this manner and may even simultaneously use all three sensing parameters.

In FIGS. 2 and 2A is shown an exploded view of the mechanical and optical arrangement of the various elements of the light activated acoustic pinger 17 of the present invention. Mounted against the interior face of housing 23 is torroidal transducer 25 which has its case grounded and its lead wire 27 connected to the output of the light activated acoustic pinger circuit 29. A housing ground lead wire 31 is connected directly to the housing at pin 33. The circuit ground lead wire 35 is connected to pin 37 which is attached to housing 23 but is electrically isolated from the housing by dielectric washer 39. Power from battery 41 is supplied to circuit 29 through electrical contacts 43 and 45 and lead wire 47 and electrical contacts 49 and 51 and lead wire 53. Contacts 43 and 49 are mounted on dielectric circuit board 55. Lead wire 35, through an electrical connection on circuit board 59, is connected to one side of light responsive photoelectric cell 61. The other side of the cell 61 is connected by the lead wire 63 to circuit 29 as electrically shown in FIG. 3. A styrofoam insulator 65 is provided as a shock isolation mounting for cell 61.

Housing 67 is cylindrical in configuration and includes an annular shoulder 69 for receiving cell 61. Housing 67 also includes a spherical cavity 71 for receiving clear acrylic sphere 73 and annular shoulder 75 for receiving O-ring 77. A retainer ring 79 includes shoulder 81 and an opening 83, having a diameter that is about 0.005 inch less than the diameter of sphere 73 (0.50 inch) for retaining sphere 73 in place and in sealing engagement with O-ring 77 and O-ring 85. The light actuated acoustic pinger 17 is assembled as illustrated and is retained in place by a plurality of set screws 87.

In FIG. 2A is illustrated an end view of light responsive photoelectric cell 61 and acrylic sphere 73. Cell 61 has a light responsive element 89 that is positioned in an area generally defined by diameter D. It should be noted that acrylic sphere 73 has a flattened surface 91 having a diameter D that generally corresponds to and is adjacent the light responsive element 89 when the pinger 17 is assembled. It has been found that this arrangement and construction provides maximum light collection and transmission by sphere 73 to the surface of element 89 as desired. The reason for this can be seen by reference to FIG. 2A where the incoming solid light ray 93 is transmitted through the flat surface 91 to element 89 whereas, if the flattened surface were not provided and left spherical, then ray 98 would have been reflected back out of the sphere 73 as illustrated by dotted line light ray 95. It has been found that this lens and light responsive element system provide a very effective light gathering system that effectively collects light from angles in excess of 45° from longitudinal axis 97 of the system.

In FIG. 3 is illustrated the electrical circuit 29 of the light activated acoustic pinger 17 of the present invention. This circuit includes light responsive photoelectric cell 61 that has a very large resistance when no light is impinging upon its photoelectric surface and decreases in resistance with increase in light intensity. With the lens system of FIG. 2 it has been found that maximum light is collected and transmitted to element 89 of cell 61 when the light beam center 19 is coincident with the longitudinal axis 97 of the acoustic pinger. In addition, the cell resistance increases as the angle of the light beam center increases. In addition, it has been found as shown in FIGS. 1B, 1C and 1D that for a given angle $\theta$, for example 20°, of the light beam center 19 from the pinger axis 97 that the light beam axis may be varied by an angle $\alpha$ of $\pm 5°$, for example, and will result in substantial decrease in the ping rate of the audible sound waves from $r_1$ to $r_2$ (where $\alpha_2 = +5°$) and a substantial decrease in the ping rate of the audible sound waves from $r_1$ to $r_3$ (where $\alpha_3 = -5°$). This has been used in murky waters when the target is at a distance of about 100 feet from the diver and the diver has a collimated light source having a power output of about 500 watts. The pinger housing 23 is system ground and has a seawater switch as previously explained with respect to FIG. 2 and as illustrated by the corresponding element and lead wire reference numerals of FIG. 3.

The primary purpose of the circuit shown in FIG. 3 is to generate a signal having a predetermined frequency and time duration at periodic time intervals. The time intervals define the ping rate which is varied as a function of the light intensity impinging upon light responsive element 89 of photoelectric cell 61. As illustrated in FIG. 4 this circuitry generates a tone burst signal having a frequency $f_1$, having a time duration $T_1$ that sequentially occurs at time intervals $T_2$. The time interval $T_2$ (ping-rate) will vary as a function of light intensity received by cell 61.

As illustrated in FIG. 3 one side of battery 41, which may be an 18 volt battery, is connected to ground and the other side is connected to the cathode of diode 117. The anode of diode 117 is connected in series through diode 119, light responsive photoconductive cell 61, pins 33 and 37 (which together comprise a closed circuit when placed in seawater) to ground. Connected in parallel with diode 119 is capacitor 125 and capacitor 127, resistor 129, and resistor 131 are connected, as shown. A diode 133, which is preferably a PNPN 4-layer diode, is connected between capacitor 125 and resistor 129. Resistor 135 is connected in series with the base of transistor 137 and resistor 139 and capacitor 141 are connected in series with the base of transistor 143. Resistor 144 is connected across the base and emitter of transistor 143. Connected in series between the emitter of transistor 143 and the collector of transistor 137 is resistor 145. Resistor 147 is connected across transistor 137 and in series with capacitor 149 and resistor 151, which are connected in parallel across resistor 145. The base of transistor 143 is connected through diode 153 and resistor 155 to the primary winding 157 of transformer 159. The collector of transistor 143 is connected through resistor 161 to ground and to the base of transistor 163. The collector of transistor 163 is connected through diode 165 and resistor 166 to primary winding 157. Capacitor 167 is connected across D.C. power source 41 through diode 117 to store energy to reduce ripples on the supply line. Capacitors 169 and 171 are connected in parallel across secondary winding 173 of transformer 159. Transducer 25 is connected as the load across secondary winding 173 of transformer 159.

The operation of the tone burst generator circuit 29 of FIG. 3 is as follows. Operation of the device is initiated by closing the seawater switch, by shorting pins 33 and 37 with emersion in seawater, and by activating photoelectric cell 61 by impinging light thereon. When this occurs capacitor 125 charges through the particular resistance of photoelectric cell 61. The time required to charge capacitor 125 is the time interval $T_2$ of FIG. 4 and is determined by the selected parameters of D.C. voltage source 41 the particular resistance of photoelectric cell 61 and capacitor 125. When the voltage across capacitor 125 reaches 10 volts, for example, diode 133 switches on momentarily to transfer a charge to capacitor 127.

When diode 133 switches on transistors 137 and 143 are simultaneously switched on. Transistor 137 is held on for a time duration $T_1$ of about 10 milliseconds, for example, as determined by the time constant of resistors 129 and 131 and capacitor 127. Transistor 143 remains on for only about 10 microseconds due to the limiting time constant of resistor 139 and capacitor 141. Transistor 143 biases transistor 163, which is the power output transistor, into saturation to provide a high current pulse to primary winding 157 of transformer 159. The tuned circuit consisting of the inductance of secondary winding 173 and the parallel capacitance of capacitors 169 and 171 and transducer 25, begin to ring or oscillate because of the single pulse applied to the primary winding 157 when transistor 163 is switched on. The parameters of the elements of the tuned circuit are preferably selected to provide a signal $f_1$ of about 45 kiloHertz, for example. The ringing also appears across primary winding 157 as a slightly dampened sinusoidal voltage having a frequency of 45 kiloHertz. One cycle after the start of the initial pulse applied to the primary the voltage at point A of the primary, minus the voltage drop across resistor 155 and diode 153, has swung positive with respect to the base of transistor 143 which turns resistor 143 on. Transistor 143 and 163 remain on until the voltage at point A swings sufficiently negative to reverse bias diode 153. This process is repeated on every positive half cycle until transistor 137 turns off at the end of 10 milliseconds. Thus the voltage across transducer 25 is a 45 kiloHertz sinusoidal tone burst of 10 milliseconds time duration $T_1$.

From this it can be seen that the ping rate (time interval $T_2$) is varied as a function of the light intensity on element 89 of photoelectric cell 61. By using the spherical lens system in conjunction with the variable ping rate circuit it has been found possible to achieve very effective three dimensional underwater navigation.

What is claimed is:

1. A method for homing on an underwater target having a light activated acoustic pinger that has a ping rate that is proportional to incident illumination and a lens system that collects oblique light comprising the steps of:
    (a) activating a collimated light source such that the emitted light is received by said pinger;
    (b) panning said light source across said pinger to determine the change in ping rate and aligning the light from said light source at maximum ping rate to establish the direction of said pinger; and
    (c) moving said light source to increase the ping rate and thereby homing said light source on said pinger.

2. The method of claim 1 wherein:
    (a) said panning of said light source across said pinger is done first on one plane and then on another plane that is normal to said one plane.

3. A light activated acoustic pinger comprising:
    (a) a transducer, a pinging circuit including a light responsive photoelectric cell and a lens system mounted in a housing;
    (b) said lens system operably positioned to collect light and transmit the collected light onto said photoelectric cell, the output of said cell operably connected to said pinging circuit, said pinging circuit including means for providing a ping rate signal that is a function of the light intensity impinging on said cell; and
    (c) the output of said pinging circuit connected to said transducer for causing said transducer to emit an acoustic signal that has a repetition rate that is responsive to said ping rate signal.

4. The pinger of claim 3 wherein:
    (a) said lens system comprises a spherical lens the front half of which is exposed to a light source environment for collecting light arriving from large incident angles.

5. The pinger of claim 4 wherein
    (a) said spherical lens has a flattened surface, the shape of which is formed by passing a plane through said sphere aft of its center and perpendicular to said sphere's horizontal axis; and
    (b) said flattened surface being adjacent and having about the same area as the light responsive element of said photoelectric cell.

6. The pinger of claim 5 wherein:
    (a) said pinger circuit includes a time duration and interval control section including a time duration capacitor and a current source connected through said photoelectric cell to said time duration capacitor; whereby
    (b) the light intensity incident on said photoelectric cell varies the current passed from said current source to said capacitor and thereby varies the charging rate of said capacitor and said time duration.

7. The pinger of claim 6 wherein:
    (a) a seawater responsive switch is positioned in series with said current source and said photoelectric cell to prevent inadvertent above surface visible light activation of said pinger.

* * * * *